United States Patent [19]

Schorum

[11] Patent Number: 5,054,005
[45] Date of Patent: Oct. 1, 1991

[54] APPARATUS AND METHOD FOR DETERMINING TRAVEL TIME OF ACOUSTIC ENERGY

[75] Inventor: Stanley Schorum, Madison, Conn.

[73] Assignee: Science Accessories Corp., Stratford, Conn.

[21] Appl. No.: 495,361

[22] Filed: Mar. 16, 1990

[51] Int. Cl.$^5$ .......................... G01S 3/80; G08C 21/00
[52] U.S. Cl. ........................................ 367/127; 178/18
[58] Field of Search ............... 367/127, 147, 907, 55, 367/108; 178/18

[56] References Cited

U.S. PATENT DOCUMENTS

| | | | |
|---|---|---|---|
| 3,626,483 | 12/1971 | Whetstone et al. | 181/0.5 |
| 3,647,962 | 3/1972 | Whetstone | 178/17 C |
| 3,731,273 | 5/1973 | Hunt | 367/127 |
| 3,838,212 | 9/1974 | Whetstone et al. | 179/18 |
| 4,012,588 | 3/1977 | Davis et al. | 367/127 |
| 4,357,672 | 11/1982 | Howells et al. | 367/127 |
| 4,641,528 | 2/1987 | Clayand, Jr. et al. | 367/907 |
| 4,814,552 | 3/1989 | Stefik et al. | 367/907 |
| 4,891,474 | 1/1990 | Kelly | 178/18 |

Primary Examiner—Jan J. Lobo
Attorney, Agent, or Firm—Martin Novack

[57] ABSTRACT

The disclosure is directed to a method and apparatus for more accurately determining the transit time of acoustic energy travel between a transmitter location and a receiver location. An electrode pair spark gap is provided at the transmitter location, and an acoustic receiver is provided at the receiver location. The spark-gap is energized to produce a spark by coupling an electrical potential across the electrode pair. The generation of a spark at the spark gap is sensed, and an initializing signal is generated in response thereto. A timer is initialized in response to the initializing signal. The receipt of acoustic energy from the spark is detected at the receiver location and a terminating signal is generated in response thereto. The timer is terminated in response to the terminating signal, and the time measured by the timer is indicative of the transit time of acoustic energy travel between the transmitter and receiver locations. In a preferred embodiment, the means for sensing the generation of a spark at the spark-gap is operative to sense a current coupled to the electrode pair.

22 Claims, 2 Drawing Sheets

APPARATUS AND METHOD FOR DETERMINING TRAVEL TIME OF ACOUSTIC ENERGY

BACKGROUND OF THE INVENTION

This invention relates to an apparatus and method for determining the position of a movable element in a data space, and to improvements in techniques for determining the travel time of acoustic energy over an unknown travel distance between an acoustic transmitter and an acoustic receiver.

Graphical digitizers are conventionally used to input graphical coordinate information, or the like, to a companion system. In a graphical digitizer, wave energy is typically passed between a movable element (such as a stylus or cursor) and one or more transducers located at fixed reference locations. The transit time of the wave energy traveling (in either direction) between the movable element and the reference locations is used in determining the position of the movable element in one, two, or three dimensions, typically in terms of digital coordinates. A type of graphical digitizer manufactured and sold by the assignee hereof, Science Accessories Corporation, measures the transit time of acoustic or sonic energy propagating through air. The transit time of sound traveling from a source on the movable element to each of a plurality of microphones is used, in conjunction with the velocity of sound in air and known geometrical relationships, to compute the position of the movable element.

The accurate determination of the transit time of the acoustic energy between the transmitter and receiver locations is critical to an accurate determination of the position of the movable element. Typically, a timer is provided for each receiver. All of the timers are started when the acoustic energy is transmitted from the transmitter. As the sound is received at each receiver, the timer associated with that receiver is stopped. The transit times to each receiver can then be computed from the time that elapsed on each timer. Typically, each timer is a digital counter which counts pulses from a digital clock generator, and the arrival of acoustic wave energy at each microphone is determined by continuously comparing the microphone output (e.g. an amplified and filtered version thereof) to a predetermined threshold level. When the threshold level is exceeded, the associated counter is turned off.

In the described type of system, a good source of acoustic wave energy pulses is a spark gap which is energized by triggering a circuit that delivers voltage pulses to a pair of closely spaced electrodes which comprise the spark gap. The trigger pulse for this circuitry is also conventionally utilized to initiate the timer or timers that are employed to measure the transit time of the acoustic wave energy over an unknown distance to be determined. [As noted above, the timers are subsequently terminated when the acoustic wave energy is received at one or more respective receivers. The measured elapsed time can be used for determination of distance or, for pilot purposes, by determination of the velocity of sound in air when the transmitter to receiver distance is known.] The spark does not occur immediately upon application of the trigger signal to the spark generation circuitry, so the timer(s) may be initiated somewhat prematurely, resulting in an incorrect elapsed time measurement. This would not necessarily be problematic if one could determine the precise time relationship between application of the trigger pulse and occurrence of the spark, since suitable correction could then be applied to the measured elapsed time. Applicant has found, however, that such solution is generally not adequate, since the time between the trigger and the actual spark can vary considerably. There is a build-up time of the voltage across the electrodes before a spark is produced (generally, at the output of the a transformer which is part of the spark generation circuitry). The build-up may not be the same for each spark to be generated and, also, the voltage at which a spark is produced can vary over the life of the electrode pair, and can also vary for different electrode pairs. This means that the timing error will tend to vary and cannot be readily accounted for by adding a predetermined timing correction.

It is among the objects of the present invention to provide solution to the problem as set forth.

SUMMARY OF THE INVENTION

The present invention is directed to a method and apparatus for more accurately determining the transit time of acoustic energy travel between a transmitter location and a receiver location. In an embodiment of the invention, an electrode pair spark gap is provided at the transmitter location, and an acoustic receiver is provided at the receiver location. The spark-gap is energized to produce a spark by coupling an electrical potential across the electrode pair. Means are provided for sensing the generation of a spark at the spark gap, and for generating an initializing signal in response thereto. A timer is initialized in response to the initializing signal. Means are provided for detecting, at the receiver location, the receipt of acoustic energy from the spark, and for generating a terminating signal in response thereto. The timer is terminated in response to the terminating signal, and the time measured by the timer is indicative of the transit time of acoustic energy travel between the transmitter and receiver locations.

In a preferred embodiment of the invention, the means for sensing the generation of a spark at the spark-gap is operative to sense a current coupled to the electrode pair. In this embodiment, the means for energizing the spark gap includes: a transformer having primary and secondary windings, the electrode pair being coupled across the secondary winding; a capacitor coupled cross the secondary winding; and means for applying a voltage pulse to the primary winding. Also in this embodiment, the means for sensing a current coupled to the electrode pair comprises a transformer coupled to a conductor which couples one of the electrodes of the electrode pair to the secondary winding.

The present invention has application to any technique or apparatus wherein it is desirable to determine, accurately and consistently, the transit time of acoustic energy generated at a spark-gap; for example, two-dimensional acoustic digitizers, three-dimensional acoustic digitizers, and one-dimensional acoustic distance or velocity determination systems.

Further features and advantages of the invention will become more readily apparent from the following detailed description when taken in conjunction with the accompanying drawings.

DESCRIPTION OF THE PREFERRED EMBODIMENT

Figure 1:
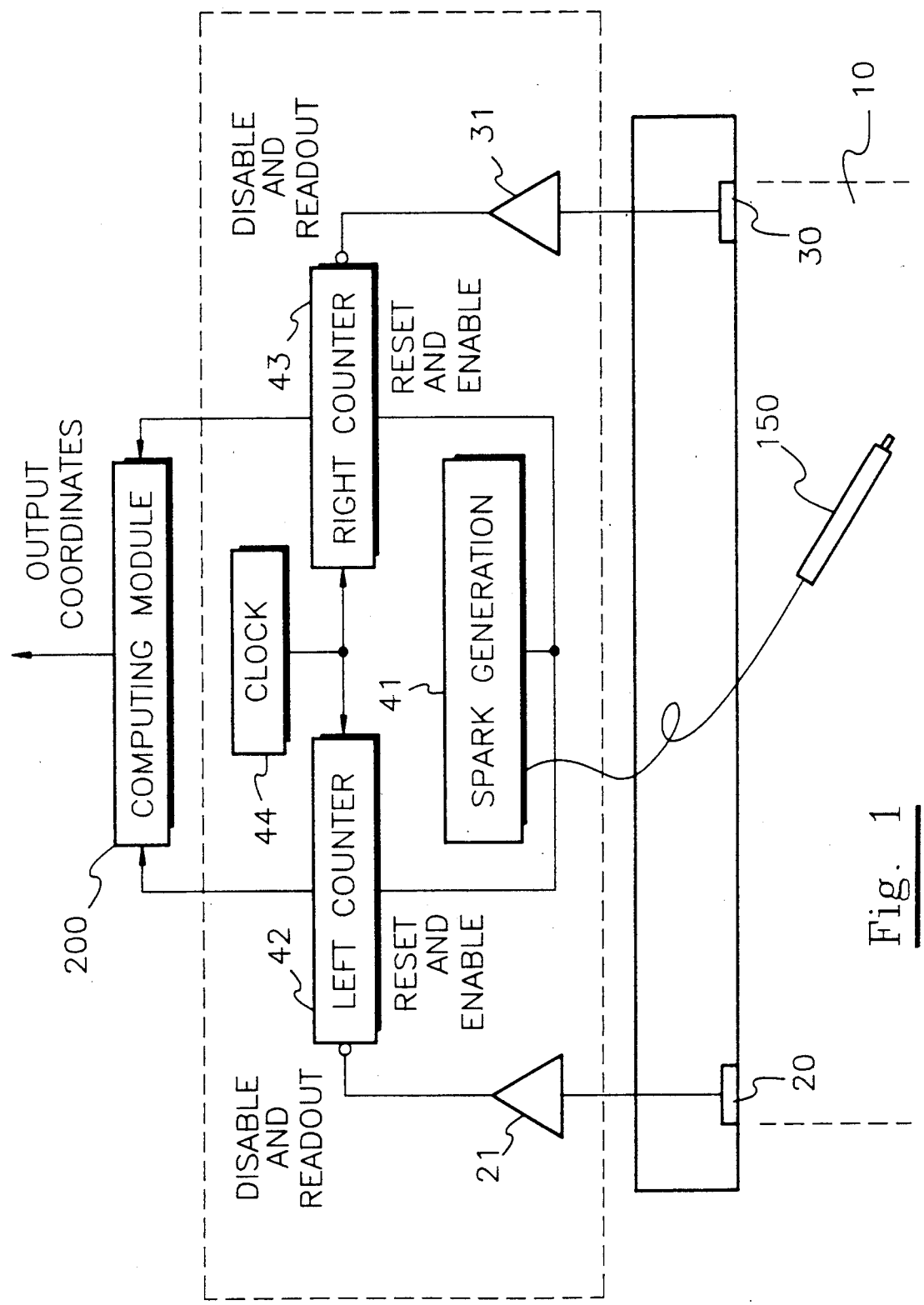
FIG. 1 is a schematic diagram, partially in block form, of an apparatus in which the improvements of the present invention can be employed.

Referring to FIG. 1, there is shown an apparatus in accordance with an embodiment of the invention for determining the position of an element movable in a region located to one side of the apparatus 100. In this illustration, the position of a movable element is determined in two dimensions, but it will be understood that the improvements described herein have application to position determination in one, two, or three dimensions, and which utilizes any desired number or configuration of transmitters and receivers. The apparatus includes an elongated housing 110 which is positioned generally adjacent an edge of the region in which the position of a movable element 150 is to be determined. The housing 110 contains a pair of spaced apart transducers 20 and 30.

In the embodiment of FIG. 1, the transducers 20 and 30 are acoustic receivers, such as point microphones, and the movable element 150 is a stylus (or other suitable device), which contains a transducer for producing acoustic wave energy. The movable element may be, for example, a spark generating stylus of the type shown in U.S. Pat. No. 4,891,474, assigned to the same assignee as the present invention. Techniques for determining the position of a movable element sound emitter with respect to a pair of receivers, such as point microphones, are well known in the art, and reference can be made, for example, to U.S. Pat. No. 4,012,588, or to equipment known as Model GP-7 "GRAFBAR" manufactured and sold by Science Accessories Corporation, the assignee hereof, for description of operation of the type of equipment in which the improvements hereof can be utilized. Briefly, however, and as illustrated in FIG. 1, the travel time duration is determined by circuitry 40, shown for convenience in dashed line to the rear of housing 110, which comprises a left counter 42, associated with the left microphone 20, a right counter 43 associated with the right microphone 30, a clock 44, and a spark generation circuit 41. Coincident with generation of the spark at movable element 150 (and as indicated by a gating signal from circuit 41), the counters 42 and 43 are enabled to begin counting pulses from clock 44. Upon initial reception of the sound wavefront, the microphones 20 and 30, which generally receive the wavefront at different times, produce outputs which are amplified and filtered (as represented by the blocks 21 and 31), and utilized to disable the counters 42 and 43, and also to cause the readout of the respective counts which are indicative of the travel times between the sound source on the movable element and the microphones. [The equipment may also include a variable gain compensation circuit, as disclosed in copending U.S. patent application Ser. No. 476,662, filed Jan. 19, 1990, and assigned to the same assignee as the present application.] The respective distances can then be computed, in known manner, by multiplying the travel times by the velocity of sound in air. This can be implemented, for example, by computing module 200, or any suitable dedicated or general purpose processor.

Figure 2:
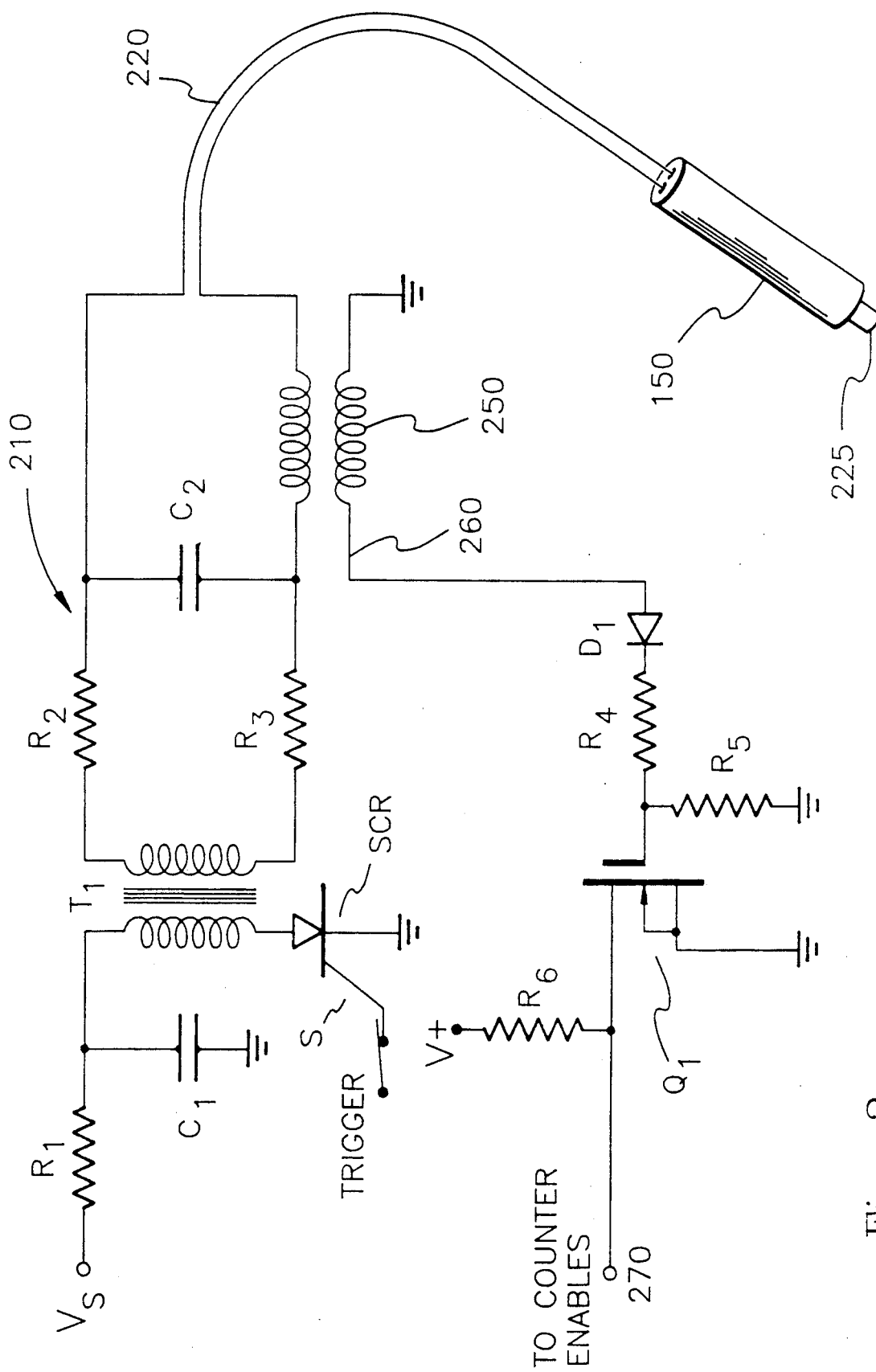
FIG. 2 is a schematic diagram of the spark generation and sensing circuitry in accordance with an embodiment of the apparatus of the invention and which can be employed in practicing an embodiment of the method of the invention.

FIG. 2 illustrates an embodiment of the circuit 41 as improved in accordance with the present invention, and which can be used in practicing an embodiment of the method of the invention. In the embodiment of FIG. 2, a supply voltage, $V_s$, is utilized to charge a capacitor $C_1$ via a resistor $R_1$. The capacitor has a discharge path through the primary winding of a transformer $T_1$ and a silicon controlled rectifier (labeled SCR), when the SCR is conductive. As in known in the art, trigger pulses are applied, at appropriate times, to the trigger the gate electrode g of the SCR to render the SCR conductive and cause a pulse of relatively high voltage across the transformer secondary winding. When the SCR turns off, the capacitor can again be charged and awaits the next trigger pulse. The circuit, as just described, is known in the art, and it can be noted that prior art systems typically also utilize the trigger signal, or a signal derived therefrom, to initialize the counters 42 and 43, as first described above.

In the present embodiment, the secondary winding of the transformer $T_1$ is coupled, via a filter 210 and cable 220, to a spark gap electrode pair 225 which is illustrated as being at the tip of a stylus 150 (as in FIG. 1). The filter 210 comprises series resistors $R_2$ and $R_3$, and a capacitor $C_2$ in parallel with the spark gap. In this embodiment, the current to the spark gap is sensed, without conductive coupling, by utilizing a transformer 250. In an operating embodiment hereof, a twin-hole balun core was employed for this purpose. One of the conductors that is coupled to cable 220 is passed through a hole of the balun core 250. A further conductor 260 is passed through the other hole of the balun core. One end of conductor 260 is coupled to ground reference potential, and the other end is coupled, via a diode $D_1$ and a resistor $R_4$, to the gate electrode of a field-effect transistor $Q_1$. The gate electrode of $Q_1$ is also coupled, via resistor $R_5$, to ground reference potential. In the present embodiment, the drain electrode of $Q_1$ is coupled to a positive bias voltage $V+$ via a resistor $R_6$, and the source electrode of $Q_1$ is coupled to ground reference potential. An output 270, which is taken at the drain electrode of transistor $Q_1$, is coupled to the enable inputs of counters 42 and 43 (as in FIG. 1).

In operation, the network comprised of $R_2$, $R_3$ and $C_2$ forms low pass filter 210, which limits the transformer secondary current at breakdown [i.e., when there is arcing across the spark gap electrode pair]. $C_2$ discharges very quickly when the arc is initiated, and a very short steep current pulse flows from $C_2$ into the cable 220 at the onset of the arc. The magnitude of the pulse depends on the value of $C_2$, the breakdown voltage, and the speed of breakdown. The occurrence of this current pulse indicates, with good precision, the time at which the arc occurs and it is sensed, in the present embodiment, to develop a signal that is consistently related to the time of onset of the acoustic wave energy caused by the spark. The current pulse in the conductor passing through transformer 250 induces a corresponding pulse in conductor 260. This signal, applied to the gate electrode of $Q_1$, turns $Q_1$ on and causes the output voltage at 270 to go from $V+$ to substantially ground reference potential for as long as $Q_1$ is on. [Of course, if a positive-going signal rather than a negative-going signal is desired for enabling the clocks 42, 43 the output on 270 can be suitably converted, or a suitable circuit which directly generates a positive-going signal can be employed.]

The very short pulse from the secondary of transformer 250 charges the electrode capacitances of the field-effect transistor $Q_1$ which "stretch" the output while discharging through $R_5$. [If these capacitances are not adequate to sufficiently "stretch" the pulse, a small capacitance can be added between ground reference and the junction of $D_1$ and $R_4$. This will, however, subject the diode to a higher reverse voltage at the end of the pulse.] The series resistor, $R_4$, limits the peak charging current and prevents the high peak voltage from appearing at the gate electrode. The diode $D_1$ may be, for example, a Schottky-barrier diode with a fast reverse recovery time.

The invention has been described with reference to a particular preferred embodiment, but variations within the spirit and scope of the invention will occur to those skilled in the art. For example, it will be understood that other suitable circuits could be used for detecting the spark onset.

I claim:

1. A method for determining the transit time of acoustic energy travel between a transmitter location and a receiver location, comprising the steps of:
   providing an electrode pair spark gap at the transmitter location;
   providing an acoustic receiver at the receiver location;
   energizing the spark gap to produce a spark by coupling an electrical potential across said electrode pair;
   sensing the generation of a spark at the spark gap, and generating an initializing signal in response thereto;
   initializing a timer in response to said initializing signal;
   detecting, at the receiver location, the receipt of acoustic energy from the spark, and generating a terminating signal in response thereto; and
   terminating the timer in response to said terminating signal; whereby the time measured by the timer is indicative of the transit time of acoustic energy travel between said transmitter and receiver locations.

2. The method as defined by claim 1, wherein said step of initializing a timer comprises initializing a digital counter which counts clock pulses, said measured time being a digital count.

3. The method as defined by claim 1, wherein said step of sensing the generation of a spark at the spark gap comprises sensing a current coupled to the electrode pair, said initializing signal being generated in response to the sensed current.

4. The method as defined by claim 2, wherein said step of sensing the generation of a spark at the spark gap comprises sensing a current coupled to the electrode pair, said initializing signal being generated in response to the sensed current.

5. A method for determining the position of a movable element in a data region, comprising the steps of:
   providing an electrode pair spark gap at a transmitter location;
   providing a plurality of acoustic receivers at respective receiver locations;
   energizing the spark gap to produce a spark by coupling an electrical potential across said electrode pair;
   sensing the generation of a spark at the spark gap, and generating an initializing signal in response thereto;
   providing a plurality of timers associated with respective ones of the acoustic receivers;
   initializing all of said timers in response to said initializing signal;
   detecting the receipt of acoustic energy from the spark at each of the acoustic receivers, and generating respective terminating signals in response thereto;
   terminating the timers in response to the respective terminating signals; and
   computing the position of the movable element from the times measured by the timers.

6. The method as defined by claim 5, wherein said step of initializing all timers comprises initializing respective digital counters, each of which counts clock pulses, said measured times being digital counts.

7. The method as defined by claim 5, wherein said step of sensing the generation of a spark at the spark gap comprises sensing a current coupled to the electrode pair, said initializing signal being generated in response to the sensed current.

8. The method as defined by claim 6, wherein said step of sensing the generation of a spark at the spark gap comprises sensing a current coupled to the electrode pair, said initializing signal being generated in response to the sensed current.

9. Apparatus for determining the transit time of acoustic energy travel between a transmitter location and a receiver location, comprising:
   an electrode pair spark gap at the transmitter location;
   an acoustic receiver at the receiver location;
   means for energizing the spark gap to produce a spark by coupling an electrical potential across said electrode pair;
   means for sensing the generation of a spark at the spark gap, and for generating an initializing signal in response thereto;
   a timer which is initialized in response to said initializing signal; and
   means for detecting the receipt of acoustic energy from the spark at the receiver location and for generating a terminating signal in response thereto, the timer being terminated in response to said terminating signal;
   whereby the time measured by the timer is indicative of the transit time of acoustic energy travel between said transmitter and receiver locations.

10. Apparatus as defined by claim 9, wherein said timer comprises a digital counter which counts clock pulses.

11. Apparatus as defined by claim 9, wherein said sensing means includes means for sensing a current coupled to the electrode pair.

12. Apparatus as defined by claim 9, wherein said means for energizing the spark gap comprises:
    a transformer having primary and secondary windings, said electrode pair being coupled across said secondary winding;
    a capacitor coupled across said secondary winding; and
    means for applying a voltage pulse to said primary winding.

13. Apparatus as defined by claim 11, wherein said means for energizing the spark gap comprises:
    a transformer having primary and secondary windings, said electrode pair being coupled across said secondary winding;
    a capacitor coupled across said secondary winding; and
    means for applying a voltage pulse to said primary winding.

14. Apparatus as defined by claim 12, wherein said means for sensing a current coupled to the electrode pair comprises a transformer coupled to a conductor which couples one of the electrodes of said electrode pair to said secondary winding.

15. Apparatus as defined by claim 13, wherein said means for sensing a current coupled to the electrode pair comprises a transformer coupled to a conductor which couples one of the electrodes of said electrode pair to said secondary winding.

16. Apparatus as defined by claim 13, further comprising a pair of series resistors respectively coupled between respective ends of said secondary winding and the respective terminals of said capacitor.

17. Apparatus for determining the position of a movable element in a data region, comprising:

an electrode pair spark gap at a transmitter location;

a plurality of acoustic receivers at respective receiver locations;

means for energizing the spark gap to produce a spark by coupling an electrical potential across said electrode pair;

means for sensing the generation of a spark at the spark gap, and for generating an initializing signal in response thereto;

a plurality of timers associated with respective ones of the acoustic receivers;

means for initializing all of said timers in response to said initializing signal;

means for detecting the receipt of acoustic energy from the spark at each of the acoustic receivers, and for generating respective terminating signals in response thereto;

means for terminating the timers in response to the respective terminating signals; and means for computing the position of the movable element from the times measured by the timers.

18. Apparatus as defined by claim 17, wherein said timer comprises a digital counter which counts clock pulses.

19. Apparatus as defined by claim 17, wherein said sensing means includes means for sensing a current coupled to the electrode pair.

20. Apparatus as defined by claim 17, wherein said means for energizing the spark gap comprises:

a transformer having primary and secondary windings, said electrode pair being coupled across said secondary winding;

a capacitor coupled across said secondary winding; and means for applying a voltage pulse to said primary winding.

21. Apparatus as defined by claim 19, wherein said means for energizing the spark gap comprises:

a transformer having primary and secondary windings, said electrode pair being coupled across said secondary winding;

a capacitor coupled across said secondary winding; and means for applying a voltage pulse to said primary winding.

22. Apparatus as defined by claim 12, wherein said means for sensing a current coupled to the electrode pair comprises a transformer coupled to a conductor which couples one of the electrodes of said electrode pair to said secondary winding.

* * * * *